United States Patent [19]
Ochi et al.

[11] Patent Number: 5,726,803
[45] Date of Patent: Mar. 10, 1998

[54] LENS-TYPE RETROREFLECTIVE SHEETING

[75] Inventors: Katsura Ochi, Kashiwa; Osamu Tanaka, Hiratsuka; Makoto Takeda, Takaoka, all of Japan

[73] Assignee: Nippon Carbide Kogyo Kabushiki Kaisha, Tokyo, Japan

[21] Appl. No.: 536,458

[22] Filed: Sep. 25, 1995

[30] Foreign Application Priority Data

Sep. 30, 1994 [JP] Japan ................................ 6-259665

[51] Int. Cl.$^6$ .................. G02B 5/122; G02B 5/124; G02B 5/128
[52] U.S. Cl. .................. 359/529; 359/530; 359/536; 359/538; 359/540
[58] Field of Search .................. 359/529, 530, 359/536, 538, 540

[56] References Cited

U.S. PATENT DOCUMENTS

| | | | |
|---|---|---|---|
| 2,326,634 | 8/1943 | Gebhard et al. | 359/540 |
| 3,190,178 | 6/1965 | McKenzie | 359/514 |
| 3,933,875 | 1/1976 | Brose et al. | 428/413 |
| 4,505,967 | 3/1985 | Bailey | 428/164 |
| 4,721,649 | 1/1988 | Belisle et al. | 428/325 |
| 4,725,494 | 2/1988 | Belisle et al. | 428/325 |
| 4,751,140 | 6/1988 | Ishihara | 428/324 |
| 4,876,141 | 10/1989 | Kobayashi et al. | 428/217 |
| 4,957,335 | 9/1990 | Kuney, Jr. | 359/541 |
| 4,983,458 | 1/1991 | Dejaiffe | 359/540 |
| 5,069,964 | 12/1991 | Tolliver et al. | 359/529 |
| 5,175,414 | 12/1992 | Hara et al. | 219/528 |
| 5,275,856 | 1/1994 | Calhoun et al. | 428/40 |
| 5,342,682 | 8/1994 | Vogelgesang et al. | 428/325 |
| 5,356,617 | 10/1994 | Schlossman | 424/63 |
| 5,361,914 | 11/1994 | Parker | 211/41 |
| 5,492,741 | 2/1996 | Akao et al. | 428/35.1 |

FOREIGN PATENT DOCUMENTS

| | | |
|---|---|---|
| 0102818 | 3/1984 | European Pat. Off. |
| 0125038 | 11/1984 | European Pat. Off. |
| 0171252 | 2/1986 | European Pat. Off. |
| 0399841 | 11/1990 | European Pat. Off. |
| 1446847 | 4/1969 | Germany . |
| 0407870 | 4/1940 | Japan . |
| 57-189839 | 11/1982 | Japan . |
| 59-71848 | 4/1984 | Japan . |
| 59-198402 | 11/1984 | Japan . |
| 0323402 | 1/1991 | Japan . |
| 1017060 | 1/1966 | United Kingdom . |
| WO95/27913 | 10/1995 | WIPO . |

*Primary Examiner*—Paul M Dzierzynski
*Assistant Examiner*—Mohammad Y. Sikder
*Attorney, Agent, or Firm*—Sherman and Shalloway

[57] ABSTRACT

The present invention comprises lens-type retroreflective sheeting which is excellent in appearance and having constant thickness and desired retroreflective performance, wherein the transparent microspheres in the retroreflective layer are composed of transparent microspherical lenses (A) having a refractive index of 1.8 or more and transparent microspherical fillers (B) having a refractive index different by at least 5% from the refractive index of the lenses (A).

13 Claims, 2 Drawing Sheets

LENS-TYPE RETROREFLECTIVE SHEETING

TECHNICAL FIELD TO WHICH THE INVENTION BELONGS

The present invention relates to retroreflective sheeting useful for marking or the like of signs such as road signs and construction signs; number plates of vehicles such as motorcars and motorcycles; materials for safety such as clothes and life jackets; signboards, etc.

BACKGROUND OF THE INVENTION

Retroreflective sheeting which retroreflects light toward the light source have hitherto been well known, and are widely utilized in such utilization fields as mentioned above utilizing their retroreflective performance. Above all, such retroreflective sheeting, generally called lens-type retroreflective sheeting, that transparent microspheres having high refractive index are used as the lenses and a light reflective layer is placed virtually at the focal position of the transparent microspherical lenses having high refractive index, is widely used in various uses, because of its excellent retroreflective performance and because of comparatively wide angle characteristics on the retroreflective performance.

Usually, lens-type retroreflective sheeting is roughly classified into (a) "open lens-type retroreflective sheeting" which is composed of transparent microspheres as the lenses; a light reflective layer composed of vapor-deposited metal films covering almost the hemispherical parts of the transparent microspheres; and a microspheres support in which almost the hemispherical parts coated with the vapor-deposited metal films, of the transparent microspheres are embedded so as to constitute a monolayer, and which supports the almost hemispherical parts; and wherein the surfaces of the sides not coated with the vapor-deposited metal film, of the transparent microspheres, are exposed to the air [see, for example, U.S. Pat. No. 2,326,634, Japanese Laid-open Patent Publication No. 189839/1982, etc.]; (b) "enclosed lens-type retroreflective sheeting" which is composed of transparent microspheres as the lenses; a microspheres binding layer in which almost the hemispherical parts of the transparent microspheres are embedded so as to constitute a monolayer, and which supports the almost hemispherical parts; a focus layer formed so as to cover the residual hemispherical parts of the transparent microspheres, exposed to the air on the support and so as to be concentrically spherical along the transparent microspheres and have an almost uniform thickness; and a light reflective layer composed of vapor-deposited metal films, formed on the sides of the focus layer, opposite to the sides which are contacted with the transparent microspheres; and wherein the transparent microspheres are enclosed into the resin layers of the microspheres binding layer, focus layer, etc. [see, for example, Japanese Laid-open Patent Publication No. 71848/1984 (=U.S. Pat. No. 4,721,694, U.S. Pat. No. 4,725,494 and EP 102,818), Japanese Laid-open Patent Publication No. 198402/1984 (=U.S. Pat. No. 4,505,967 and EP 125,038), etc.]; and (c) "encapsulated lens-type retroreflective sheeting" which is composed of transparent microspheres as the lenses; a light reflective layer composed of vapor-deposited metal films covering almost the hemispherical parts of the transparent microspheres; a microspheres support in which almost the hemispherical parts coated with the vapor-deposited metal films, of the transparent microspheres are embedded so as to constitute a monolayer, and which supports the almost hemispherical parts; a transparent surface protective film placed on the surface sides of the microspheres exposed to the air on the support; and binding walls binding the microspheres support and the surface protective film so as to form continuous lines whereby a large number of sealed, small compartment cells (capsules) containing inside transparent microspheres [see, for example, Japanese Patent Publication No. 7870/1965 (=U.S. Pat. No. 3,190,178, German patent No. 1,446,847 and U.K. Patent No. 1,017,060), etc.].

Signs, etc. utilizing such retroreflective sheeting generally comprise an information region aiming at notifying people who visually recognize the signs, of information, and a background region which functions as the background of the information region. It is important that these signs, etc. have retroreflective performance as a whole, and give excellent visual recognizability to the people who visually recognize the signs, and, in addition, it is also important to give difference in brightness (retroreflective performance) between the information region and the background region at the time of visual recognition.

Namely, in order to accurately communicate information shown in the information region to people who visually recognize the signs, it is important that the brightness of the information region is not equal to the brightness of the background region, and the information region has a certain degree or more of contrast to the brightness of the background region. Therefor, it is necessary that there is a certain degree or more of difference in retroreflective performance between retroreflective sheeting used for the information region and retroreflective sheeting used for the background region. Thus, development of a technique is strongly desired capable of easily controlling the retroreflective performance of retroreflective sheeting in accordance with its uses, etc. to give desired values.

Heretofore, a few methods for enhancing the retroreflective performance of retroreflective sheeting have been known, and, for example, in Japanese Laid-open Patent Publication No. 71848/1984 (=U.S. Pat. No. 4,721,694, U.S. Pat. No. 4,725,494 and EP 102,818), such retroreflective sheeting is proposed that its retroreflective performance is enhanced by making transparent microspheres adhere to a low adhesive polymer layer, and, if necessary, supplementally embedding the transparent microspheres, and thereby, increasing the packing ratio of the microspheres per the unit area of the retroreflective sheeting. As understood from the foregoing, in the above official bulletins, a method for increasing the packing ratio of the transparent microspheres is only disclosed, and there is no disclosure on a method for freely control the packing ratio of the transparent microspheres.

Further, heretofore, it has been known that when, as transparent microspheres used as the lenses, those having a large average particle size are used, high retroreflective performance is obtained, and when transparent microspheres having a small average particle size are used, low retroreflective performance is obtained, and, for example, in Japanese Laid-open Patent Publication No. 23402/1991 (=U.S. Pat. No. 4,957,335 and EP 399,841A), retroreflective sheeting having excellent retroreflective performance wherein microspheres having an average refractive index of 1.915 or more and a comparatively large average particle size of 75 µm or more. However, this retroreflective sheeting has problems, e.g. that it becomes necessary to prepare many kinds of transparent microspheres having mutually different average particle sizes according to values of retroreflective performance necessitated, and variance on the thicknesses of the retroreflective sheeting occurs due to difference in the particle sizes of the transparent microspheres.

SUMMARY OF THE INVENTION

A main object of the present invention lies in providing lens-type retroreflective sheeting having superb characteristics, wherein the above-mentioned disadvantages of the prior art are obviated, by developing a technique whereby it is possible to control its retroreflective performance freely and easily, without changing the packing amount and average particle size of the transparent microspheres, and without inhibiting the inherent retroreflective performance of the retroreflective sheeting.

As a result of various investigations on control of the retroreflective performance of retroreflective sheeting, the present inventors found that it is possible to control the retroreflective performance of retroreflective sheeting freely and easily by using transparent microspheres wherein transparent microspherical lenses contributing to retroreflective performance and transparent microspherical fillers not substantially contributing to retroreflective performance are mixed, and only by changing the mixing ratio between the transparent microspherical lenses and the transparent microspherical fillers, with the total packing amount of the transparent microspheres secured so that the appearance of the retroreflective sheeting may not be spoiled (namely, without reducing the packing amount of the transparent microspheres), and without necessity to change the average particle size of the transparent microspheres, and it is possible to obtain lens-type retroreflective sheeting having superb characteristics wherein disadvantages which usual retroreflective sheeting as mentioned above has are obviated, and completed the present invention.

Thus, according to the present invention, there is provided lens-type retroreflective sheeting wherein the transparent microspheres in the retroreflective layer are composed of transparent microspherical lenses (A) having a refractive index of 1.8 or more and transparent microspherical fillers (B) having a refractive index different by at least 5% from the refractive index of the lenses (A).

Since the retroreflective performance of the lens-type retroreflective sheeting of the present invention is varied almost depending on the packing amount of the transparent microspherical lenses (A) per the unit area of the retroreflective sheeting, it is possible to control the retroreflective performance of the retroreflective sheeting by adjusting the packing amount of the transparent microspherical lenses (A). Namely, when the packing amount of the transparent microspherical lenses (A) per the unit area of the retroreflective sheeting is increased, the retroreflective performance of the retroreflective sheeting is increased, whereas when the packing amount of the transparent microspherical lenses (A) is decreased, the retroreflective performance of the retroreflective sheeting is lowered.

In this connection, in the retroreflective sheeting of the present invention, the adjustment of the packing amount of the transparent microspherical lenses (A) can freely be conducted by varying the mixing ratio between the transparent microspherical lenses (A) and the transparent microspherical fillers (B), with the total packing amount of both transparent microspheres (A) and (B) held to be constant.

The lens-type retroreflective sheeting of the present invention is further detailedly described below.

In the retroreflective sheeting of the invention, the transparent microspherical lenses (A) exist in the retroreflective layer, and are an element for reflecting light applied onto the retroreflective sheeting in almost the same direction as the direction of incidence, namely an element which functions as lenses having retroreflective performance. Therefore, as the transparent microspherical lenses (A) are used those which are transparent and transmit light well, and are composed of a material having a high refractive index of 1.8 or more.

It is unnecessary that the refractive index of the transparent microspherical lenses (A) is strictly limited, and the refractive index can appropriately be selected within the range of 1.8 or more, taking the refractive index of materials placed around the transparent microspherical lenses (A), the presence or absence of a gaseous layer, the position of the light reflective layer, etc. into account. For example, when, as in sealed lens-type retroreflective sheeting, the transparent microspheres are covered with a resin having a refractive index of the order of 1.3 to 1.6, it is, usually, desirable to use as the lenses (A) transparent microspheres having a refractive index within the range of 2.0 to 2.9. Further, for example, when, as in open lens-type retroreflective sheeting and in encapsulated lens-type retroreflective sheeting, the transparent microspheres are contacted With a gas having a refractive index of the order of 1.0 such as air, it is, usually, desirable to use as the lenses (A) transparent microspheres having a refractive index within the range of 1.8 to 2.0.

As materials for forming the transparent microspherical lenses (A), either of inorganic materials and organic materials can be used so long as they have a refractive index of 1.8 or more, and are transparent and transmit light well, but generally, glasses having high refractive index such as $BaO$-$TiO_2$ glass and lead oxide glass are preferred.

The particle size of the transparent microspherical lenses (A) is not particularly limited and can be varied over a wide range in accordance with the uses of the retroreflective sheeting, but in view of the thickness of the retroreflective sheeting, the height of the retroreflective performance, etc., those having an average particle size (hereafter, sometimes merely referred to as particle size) within the range of 20 to 120 μm, particularly 40 to 100 μm, further particularly 60 to 80 μm are preferred.

On the other hand, the transparent microspherical fillers (B) used an combination with the transparent microspherical lenses (A) play a role as a filler for filling up the part where the transparent microspherical lenses (A) are not packed in the retroreflective layer of the retroreflective sheeting, and make it possible to control the retroreflective performance of the retroreflective sheeting within a desired range, by filling up, together with the transparent microspherical lenses (A), the retroreflective layer uniformly and comparatively close and only by varying the packing ratio between the transparent microspherical lenses (A) and the transparent microspherical fillers (B), without spoiling the appearance of the retroreflective sheeting at all.

Thus, the transparent microspherical fillers (B) should not be those which substantially exert a function as lenses having retroreflective performance, and it is necessary for them to have a refractive index substantially different from that of the transparent microspherical lenses (A). Namely, it is desirable that the refractive index of the transparent microspherical fillers (B) is different by at least 5% from the refractive index of the transparent microspherical lenses (A). When the difference in refractive index is smaller than 5%, it becomes difficult to distinguish the transparent microspherical lenses (A) and the transparent microspherical fillers (B), the addition effect of the transparent microspherical fillers (B) becomes small, and it becomes difficult to control the retroreflective performance of the retroreflective sheeting. Thus, for attaining further preferred control of the retroreflective performance of the retroreflective sheeting, it is desirable that the refractive index of the transparent microspherical fillers (B) differs from the refractive index of the transparent microspherical lenses (A) by 10 or more, preferably 15% or more, further preferably 20% or more.

The refractive index of the transparent microspherical fillers (B) may be higher or lower than the refractive index of the transparent microspherical lenses (A), but, as stated above, it is unnecessary for the transparent microspherical fillers (B) to fulfill a lens function, and therefore, it is sufficient if they are composed of a material having a refractive index lower than the refractive index of the transparent microspherical lenses (A).

Materials for forming the transparent microspherical fillers (B) are not particularly limited so long as they are materials satisfying the above refractive index condition, and either of inorganic materials having transparency and organic materials having transparency can be used, but, in general, resin materials such as acrylic resins and styrene resins, and glass materials such as soda-lime glass, aluminoborosilicate glass, borosilicate glass, BaO-TiO$_2$ glass and lead oxide glass are preferably used, and above all, soda-lime glass is particularly preferred.

Although not particularly limited thereto, it is preferred, for avoiding that the appearance of the retroreflective sheeting is badly influenced, that the particle size of the transparent microspherical fillers (B) is as close as possible to the particle size of the transparent microspherical lenses (A), and, usually, it is possible to use transparent microspherical fillers (B) having a particle size of 1/2 to 3/2, preferably 2/3 to 4/3, more preferably 3/4 to 5/4 of the particle size of the transparent microspherical lenses (A).

In the lens-type retroreflective sheeting of the present invention, the transparent microspherical lenses (A) and the transparent microspherical fillers (B) are mixed at any ratio selected in accordance with retroreflective performance desired for retroreflective sheeting, and placed comparatively close in a monolayer as one layer constituting the retroreflective layer of the retroreflective sheeting. In this connection, for giving the retroreflective sheeting a desirable appearance, it is desirable to place both microspheres so that the total packing ratio of both microspheres per the unit area of the retroreflective sheeting may be generally 60 to 90%, preferably 65 to 85%, more preferably 70 to 80%. In thins connection, the total packing ratio is a value obtained through measurement according to the following method.

Measurement of the total packing ratio of microspheres

A lens-type retroreflective sheeting sample is observed from the light incidence side by an optical microscope, the occupancy area ratios of the transparent microspheres on the CRT display image is measured using an image processing apparatus ["Videomicrometer VM-30", made by OLYMPUS OPTICAL CO., LTD.], and their average value is assumed to be the total packing ratio of the microspheres.

The mixing ratio of the transparent microspherical lenses (A) and the transparent microspherical fillers (B) can be selected based on retroreflective performance desired for the retroreflective sheeting, but, usually, it is convenient that the amount of the transparent microspherical fillers (B) to the amount of the transparent microspherical lenses (A) in terms of their number ratio (B)/(A) is within the range of generally 1/10 to 5/1, preferably 1/5 to 9/2, more preferably 1/3 to 4/1. The number ratio (B)/(A) between the two kinds of transparent microspheres can be determined through calculation according to the following equation based on the weight ratio between the transparent microspherical lenses (A) and the transparent microspherical fillers (B).

$$n = \left(\frac{d_A}{d_B}\right)^3 \cdot \left(\frac{\rho_B}{\rho_B}\right) \cdot m$$

wherein $d_A$ is the particle size of the transparent microspherical lenses (A), $d_B$ is the particle size of the transparent microspherical fillers (B), $P_A$ is the density of the transparent microspherical lenses (A), $P_B$ is the density of the transparent microspherical fillers (B), m is the weight ratio (B)/(A) between the two kinds of transparent microspheres, and n is the number ratio (B)/(A) between the two kinds of transparent microspheres.

The lens-type retroreflective sheeting of the present invention includes the aforesaid open lens-type retroreflective sheeting, enclosed lens-type retroreflective sheeting and encapsulated lens-type retroreflective sheeting, and their constitution can be made to be essentially the same constitution as the above so far known three kinds of lens-type retroreflective sheetings have, except that the transparent microspheres of the retroreflective layer are composed of a mixture of the transparent microspherical lenses (A) acting as lenses showing retroreflective performance and the transparent microspherical fillers (B) not substantially acting as lenses.

Hereafter, the constitution of the lens-type retroreflective sheeting of the present invention is further described according to specific examples shown in FIGS. 1 to 3.

DETAILED DESCRIPTION OF THE DRAWING

Figure 1:
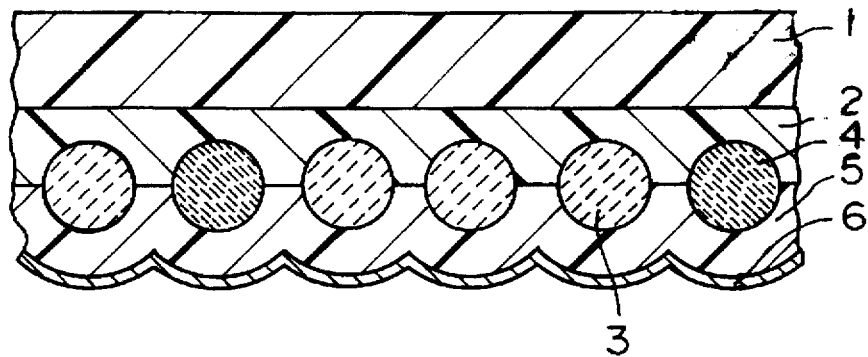
FIG. 1 is a schematic cross section showing the constitution of a specific example of enclosed lens-type retroreflective sheeting according to the invention.

As shown in FIG. 1, the enclosed lens-type retroreflective sheeting according to the present invention has such a structure that a surface protective layer (1), a microspheres binding layer (2) and a focus layer (5) are successively built up, and, at the junction interface between the microspheres binding layer (2) and the focus layer (5), transparent microspherical lenses (3) and transparent microspherical fillers (4) are embedded and supported so that almost the hemispherical parts of them [(3) and (4)] may be embedded in the layers, respectively. The surface protective layer (1) is, usually, a colored or uncolored transparent resin layer having a thickness of 10 to 60 µm, and the microspheres binding layer (2) is, usually, a colored or uncolored transparent resin layer having a thickness of 10 to 60 µm.

On the other hand, the focus layer (5) is formed so that the surface at the side opposite to the side contacting with the microspheres binding layer becomes positions almost corresponding to the loci of the transparent microspherical lenses (3), and so as to be as concentrically spherical as possible along the transparent microspheres and have an almost uniform thickness, and the surface is covered with a light reflective layer (6). The focus layer (5) is, usually, composed of a transparent resin layer, and its thickness is determined based on the refractive index of the transparent microspherical lenses (3), the refractive index of the resin compositions, etc. covering the peripheries of the transparent microspheres, etc. As the light reflective layer (6), vapor-deposited metal film such as a vapor-deposited aluminum film having a thickness of 0.03 to 0.3 µm is usually used.

Figure 2:
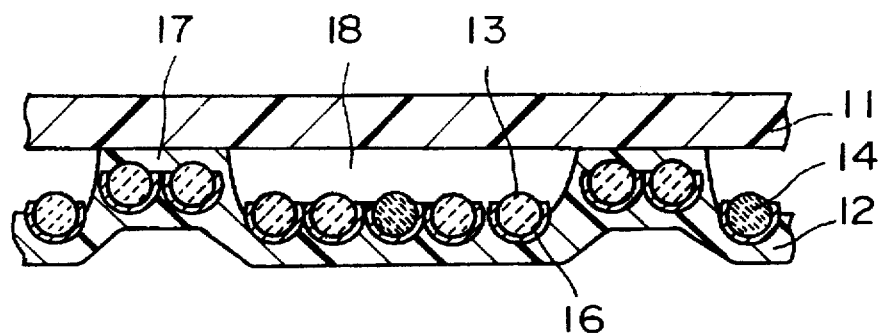
FIG. 2 is a schematic cross section showing the constitution of a specific example of encapsulated lens-type retroreflective sheeting according to the invention.

As shown in FIG. 2, the encapsulated lens-type retroreflective sheeting according to the invention is composed of a microspheres support (12) in which, at one side thereof, transparent microspherical lenses (13) and transparent microspherical fillers (14) are partially embedded, and a surface protective film (11) placed on the transparent microspheres on the microspheres support, apart from the microspheres support through slight spaces, and the surface protective film (11) and the microspheres support (12) are bound through binding walls (17) formed by partially thermal deforming the microspheres support, and thereby capsules (18) in which gas, etc. are shut are formed.

On the other hand, at almost the hemispherical part of the transparent microspheres (13) and (14) at the embedded side, a light reflective layer (16) is formed. Further, as to the transparent microspherical lenses (13), the refractive index of the transparent microspherical lenses, the refractive index of the gas covering the surfaces of the transparent microspheres, etc. are adjusted so that the surfaces of the transparent microspheres, covered with the light reflective layer may be located at positions almost corresponding to the foci of the lenses.

The above surface protective film (11) can, usually, be a colored or uncolored transparent resin film having a thickness of 20 to 150 µm, the microspheres support (12) can, usually, be a colored or uncolored resin film having a thickness of 20 to 120 µm, and the light reflective layer (16) can, usually, be a vapor-deposited metal film such as a vapor-deposited aluminum film having a thickness of 0.03 to 0.3 µm.

Figure 3:
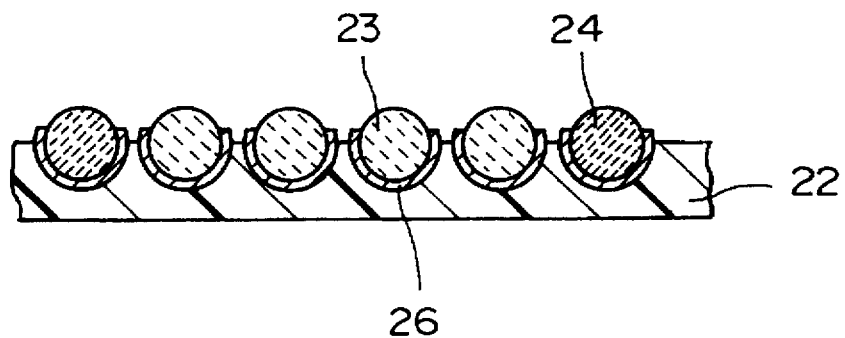
FIG. 3 is a schematic cross section showing the constitution of a specific example of open lens-type retroreflective sheeting according to the invention.

The open lens-type retroreflective sheeting according to the invention has a cross-sectional structure as shown in FIG. 3, and usually has such a structure that transparent microspherical lenses (23) and transparent microspherical fillers (24) are embedded in and supported by one surface of a microspheres support (22) composed of a colored or uncolored resin having a thickness of 20 to 120 µm. A light reflective layer (26) is formed at the back faces (almost the hemispherical surfaces at the embedded side) of the transparent microspheres (23) and (24), and the refractive index of the transparent microspherical lenses (23) is adjusted so that the back faces of the transparent microspherical lenses (23) may be located at positions almost corresponding to the loci of the lenses. Usually, in the open lens-type retroreflective sheeting, since the surfaces of the transparent microspherical lenses are covered with the air, the refractive index of the transparent microspherical lenses is adjusted to the order of 1.9. The light reflective layer (26) is, usually, a vapor-deposited metal film such as a vapor-deposited aluminum film having a thickness of 0.03 to 0.3 µm.

If desired, it is further possible to append to the lens-type retroreflective sheeting of the present invention an adhesive layer for sticking the retroreflective sheeting on a certain material, a release substrate for preventing dust, etc. from adhering to the adhesive layer, etc.

Figure 4:
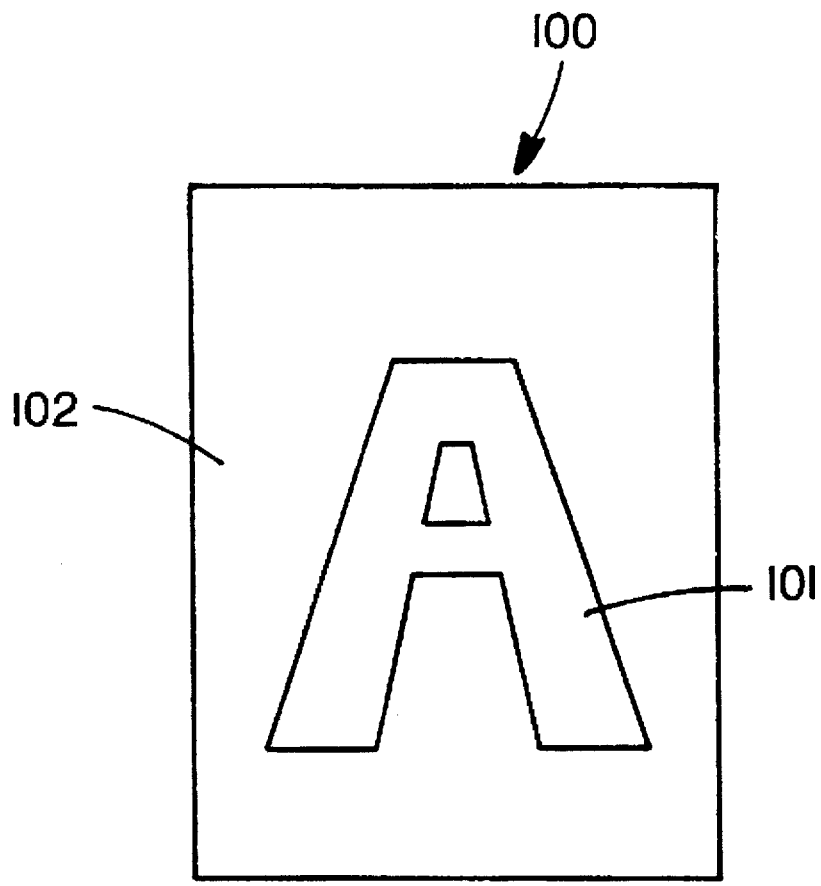
FIG. 4 is a view, in elevation, of a sign according to the invention.

FIG. 4 illustrates a sign 100 including a region 101 for displaying information and formed from lens-type retroreflective sheeting according to the invention and a region 102 providing background for region 101. The sign may be adhered to a suitable substrate. Region 101 and region 102 will, by virtue of having different mixing ratios of lenses (A) to fillers (B), be of different brightness when the sign is illuminated.

The lens-type retroreflective sheeting of the present invention having the above-mentioned constitution can be produced using materials and methods so far known, except that a mixture of the transparent microspherical lenses (A) and the transparent microspherical fillers (B) is used as the transparent microspheres.

Namely, the enclosed lens-type retroreflective sheeting according to the invention can be produced, using as the transparent microspheres a mixture of the transparent microspherical lenses (A) and the transparent microspherical fillers (B), and according to methods described in the aforesaid Japanese Laid-open Patent Publication No. 71848/1984 (=U.S. Pat. No. 4,721,694, U.S. Pat. No. 4,725,494 and EP 102,818), Japanese Laid-open Patent Publication No. 198402/1984 (=U.S. Pat. No. 4,505,967 and EP 125,038), etc. The encapsulated lens-type retroreflective sheeting according to the invention can be produced by the same methods as described in the aforesaid Japanese Patent Publication No. 7870/1965 (=U.S. Pat. No. 3,190,178, German Patent No. 1,446,847 and U.K. Patent No. 1,017,060), etc., except for using as the transparent microspheres a mixture of the transparent microspherical lenses (A) and the transparent microspherical fillers (B). Further, the open lens-type retroreflective sheeting according to the invention can be produced by the same methods described in the aforesaid U.S. Pat. No. 2,326,634, Japanese Laid-open Patent Publication No. 189839/1982, etc., and using as the transparent microspheres a mixture of the transparent microspherical lenses (A) and the transparent microspherical fillers (B).

The present invention is further specifically described below by examples and comparative examples. Test methods in these examples and comparative examples are as follows.

(1) Retroreflective performance

The reflective performance of obtained lens-type retroreflective sheeting was measured according to the measurement method for reflective performance described in JIS Z-9117, and assumed to be retroreflective performance. As to angle conditions therefor, an observation angle of 0.2° and an incident angle of 5° were adopted.

(2) Appearance

The appearance of obtained lens-type retroreflective sheeting was evaluated according to the following evaluation points.

5: Being a sheet whose appearance is very uniform and beautiful.

4: There are partially minute, spotted unevenness on its appearance.

3: There are partially spotted unevenness on its appearance.

2: There are minute, spotted unevenness all over its appearance.

1: The whole sheet are spotted and has a very bad appearance.

REFERENCE EXAMPLE 1

(Standard Sample of Open Lens-Type Retroreflective Sheeting)

BaO-TiO$_2$ high refractive index glass transparent microspherical lenses having a refractive index of about 1.9, a particle size of about 65 μm and a density of about 4.2 g/cm³ were close spread on polyethylene (PE) laminated paper having a polyethylene layer having a thickness of about 20 μm, and the microspherical lenses were embedded up to about ⅓ of the diameters of the microspherical lenses into the PE layer with heat and pressure applied. The total packing ratio of the microspherical lenses at that time was about 70%. Then, metal aluminum was vacuum deposited on the side of the PE laminated paper in which the microspherical lenses were embedded to form vapor-deposited metal films having a thickness of about 0.1 μm on the projected microspherical lenses.

Then, a urethane resin solution consisting of 100 weight parts of a polyester urethane resin having a solid content of 35% by weight ["Nipporan N-5241" made by Nippon Polyurethane Kogyo Co., Ltd.], 15 weight parts of titanium dioxide and 15 weight parts of methyl isobutyl ketone (MIBK) was applied onto a silicone-treated polyethylene terephthalate (PET) process substrate having a thickness of about 20 μm, the greater part of the solvent was dried and removed to form a microspheres support having a thickness of about 80 μm.

The previously prepared PE laminated paper in which the metalized glass transparent microspherical lenses were embedded was superposed on the microspheres support so that the microspherical lenses could face the microspheres support, and the microspherical lenses were embedded in the microspheres support with heat and pressure applied so that about ½ of the diameters of the microspherical lenses was embedded. Thereafter, the PE laminated paper was removed to produce open lens-type retroreflective sheeting. The characteristic values and packing ratio of the glass microspherical lenses used for this retroreflective sheeting, and the retroreflective performance of the resultant sheeting and the result of its appearance evaluation are shown in Table 1.

REFERENCE EXAMPLE 2

(Standard Sample of Encapsulated Lens-Type Retroreflective Sheeting)

A urethane resin film having a thickness of about 100 μm ["Sheedum TPU DUS212-ER" made by Sheedum Co., Ltd.] was superposed, as a surface protective film, on the embedded transparent microspherical lenses side of the open lens-type retroreflective sheeting of Reference example 1, and the resultant superposition matter was passed between a metal roll having network projections having a line width of about 0.3 mm and a surface temperature of about 170° C. and a rubber roll having a surface temperature of about 60° C., under pressurization, in such a manner that the surface protective film side was contacted with the rubber roll, and the microspheres support of the open lens-type retroreflective sheeting was thermally fused and deformed and made to adhere partially and reticularly to the surface protective film so that a large number of capsules could be formed on the embedded microspherical lenses side of the open lens-type retroreflective sheeting, whereby encapsulated lens-type retroreflective sheeting was produced. The characteristic values and packing ratio of the glass microspherical lenses used for this retroreflective sheeting, and the retroreflective performance of the resultant sheeting and the result of its appearance evaluation are shown in Table 1.

REFERENCE EXAMPLE 3

(Standard Sample of Enclosed Lens-Type Retroreflective Sheeting)

A urethane resin composition solution consisting of 100 weight parts of a polyester urethane resin having an average molecular weight of about 6,000 and a solid content of about 35% by weight, 7 weight parts of a melamine crosslinking agent having a solid content of about 60% by weight and 50 weight parts of MIBK was applied onto a PET film having a thickness of 75 μm, the greater part of the solvent was removed to form a transparent resin surface protective layer having a thickness of about 20 μm, on the transparent resin surface protective layer was applied a urethane resin composition solution consisting of 100 weight parts of a polyester urethane resin having an average molecular weight of about 4,000 and a solid content of about 30% by weight, 8 weight parts of an isocyanate crosslinking agent having a solid content of about 75% by weight and 50 weight parts of toluene, and the greater part of the solvent was removed to form a microspheres binding layer composed of the transparent resins, having a thickness of about 30 μm.

On this microspheres binding layer were spread close in a monolayer BaO-TiO₂ high refractive index glass transparent microspherical lenses having a refractive index of 2.2, a particle size of about 75 μm and a density of about 4.6 g/cm³, and, after being stuck thereon, the glass microspheres were pressurized by nip rolls to embed the glass microspherical lenses in the microspheres binding layer so that about ½ of the their diameters could be embedded. At that time, the total packing ratio of the microspherical lenses was about 70%.

On the side where the transparent glass microspherical lenses were exposed to the air was applied a urethane resin composition solution consisting of 100 weight parts of a polyester urethane resin solution having an average molecular weight of about 4,000 and a solid content of about 30% by weight, 3 weight parts of a melamine crosslinking agent having a solid content of about 60% by weight and 60 weight parts of toluene, and the greater part of the solvent was removed to form a transparent resin focus layer having a thickness of 25 μm. Then, metal aluminum was vacuum deposited on the transparent resin focus layer to form a light reflective layer having a thickness of about 0.1 μm, and then, the PET film was removed by peeling from the resultant sheet to produce enclosed lens-type retroreflective sheeting. The characteristic values and packing ratio of the glass microspherical lenses used for this retroreflective sheeting, and the retroreflective performance of the resultant sheeting and the result of its appearance evaluation are shown in Table 1.

EXAMPLE 1

All the same operations as in Reference example 1 were conducted except that, in Reference example 1, in place of using 100 weight parts of BaO-TiO₂ high refractive index glass microspheres having a refractive index of about 1.9, a particle size of about 65 μm and a density of about 4.2 g/cm³ as the transparent microspherical lenses, microspheres obtained by uniformly mixing 80 weight parts of the high refractive index glass transparent microspheres as the transparent microspherical lenses (A) with 20 weight parts of soda-lime low refractive index glass microspheres having a refractive index of 1.5, a particle size of about 65 μm and a density of about 2.5 g/cm³ as the transparent microspherical lenses (B) were used, and thereby, open lens-type retroreflective sheeting of the present invention was produced. The content of the transparent microspherical fillers (B) to the content of the transparent microspherical lenses (A) in terms of number ratio was 0.42/1.

The respective characteristic values, use ratio and total packing ratio of the transparent glass microspheres (A) and (B) used for this retroreflective sheeting, and the retroreflective performance of the resultant sheeting and the result of its appearance evaluation are shown in Table 1. This retroreflective sheeting had controlled, desired retroreflective performance of about 78% of the retroreflective performance in Reference example 1, and satisfied the object of the present invention.

EXAMPLES 2 AND 3

All the same operations as in Example 1 were conducted except that the use ratio between the transparent microspherical lenses (A) and the transparent microspherical fillers (B) was changed in Example 1, and thereby, open lens-type retroreflective sheetings of the present invention were produced. The respective characteristic values, use ratios and total packing ratios of the glass microspheres (A) and (B) used for the retroreflective sheetings, and the retroreflective performance of the resultant sheetings and the results of their appearance evaluation are shown in Table 1. These retroreflective sheetings had, respectively, controlled, desired retroreflective performance of about 60% and about 42% of the retroreflective performance in Reference example 1, and satisfied the object of the present invention.

COMPARATIVE EXAMPLES 1 TO 3

All the same operations as in Reference example 1 were conducted except that the packing ratio of the high refractive index glass transparent microspherical lenses was changed in Reference example 1, and thereby, usual open lens-type retroreflective sheetings were produced. The characteristic values and packing ratios of the transparent microspherical lenses used for the retroreflective sheetings, and the retroreflective performance of the resultant sheetings and the results of their appearance evaluation are shown in Table 1. These retroreflective sheetings had controlled retroreflective performance of about 70 to 40% of the retroreflective performance in Reference example 1, but were inferior in appearance, and, as a result, did not satisfy the object of the present invention.

EXAMPLES 4 TO 6

The same operations as in Reference example 2 were conducted except that, in Reference example 2, the open lens-type retroreflective sheetings produced in Examples 1 to 3 were respectively used in place of using the open lens-type retroreflective sheeting of Reference example 1, and thereby, encapsulated lens-type retroreflective sheetings of the invention were produced. The respective characteristic values, use ratios and total packing ratios of the transparent microspheres (A) and (B) used for the retroreflective sheetings, and the retroreflective performance of the resultant sheetings and the results of their appearance evaluation are shown in Table 1. These retroreflective sheetings had controlled, desired retroreflective performance and satisfied the object of the present invention.

COMPARATIVE EXAMPLES 4 TO 6

The same operations as in Reference example 2 were conducted except that, in Reference example 2, the open lens-type retroreflective sheetings produced in Comparative examples 1 to 3 were respectively used in place of using the open lens-type retroreflective sheeting of Reference example 1, and thereby, usual encapsulated lens-type retroreflective sheetings were produced. The characteristic values and packing ratios of the transparent microspherical lenses used for the retroreflective sheetings, and the retroreflective performance of the resultant sheetings and the results of their appearance evaluation are shown in Table 1. All these retroreflective sheetings were inferior in appearance, as shown in Table 1.

EXAMPLE 7

All the same operations as in Reference example 3 were conducted except that, in Reference example 3, in place of using 100 weight parts of $BaO-TiO_2$ high refractive index glass microspheres having a refractive index of about 2.2, a particle size of about 75 μm and a density of about 4.6 g/cm$^3$ as the transparent microspherical lenses, microspheres obtained by uniformly mixing 82 weight parts of the high refractive index glass transparent microspheres as the transparent microspherical lenses (A) with 18 weight parts of soda-lime low refractive index glass transparent microspheres having a refractive index of 1.5, a particle size of about 75 μm and a density of about 2.5 g/cm$^3$ as the transparent microspherical fillers (B) were used, and thereby, enclosed lens-type retroreflective sheeting of the present invention was produced. The content of the transparent microspherical fillers (B) to the content of the transparent microspherical lenses (A) in terms of number ratio was 0.40/1. The respective characteristic values, use ratio and total packing ratio of the transparent microspheres (A) and (B) used for this retro-reflective sheeting, and the retroreflective performance of the resultant sheeting and the result of its appearance evaluation are shown in Table 1. This retroreflective sheeting had controlled, desired retroreflective performance of about 85% of the retroreflective performance in Reference example 3, and satisfied the object of the present invention.

EXAMPLES 8 AND 9

All the same operations as in Example 7 were conducted except that the use ratio between the transparent microspherical lenses (A) and the transparent microspherical fillers (B) was changed in Example 7, and thereby, enclosed lens-type retroreflective sheetings of the present invention were produced. The respective characteristic values, use ratios and total packing ratios of the glass microspheres (A) and (B) used for the retroreflective sheetings, and the retroreflective performance of the resultant sheetings and the results of their appearance evaluation are shown in Table 1. These retroreflective sheetings had, respectively, controlled, desired retroreflective performance of about 66% and about 48% of the retroreflective performance in Reference example 3, and satisfied the object of the present invention.

COMPARATIVE EXAMPLES 7 TO 9

All the same operations as in Reference example 3 were conducted except that the packing ratio of the high refractive index glass transparent microspherical lenses was changed in Reference example 3, and thereby, usual sealed lens-type retroreflective sheetings were produced. The characteristic values and packing ratios of the transparent microspherical lenses used for the retroreflective sheetings, and the retroreflective performance of the resultant sheetings and the results of their appearance evaluation are shown in Table 1. All these retroreflective sheetings were inferior in appearance.

TABLE 1

| | Type | Transparent microspherical lenses (A) Refractive index | Transparent microspherical lenses (A) Particle size (μm) | Transparent microspherical fillers (B) Refractive index | Transparent microspherical fillers (B) Particle size (μm) | (B)/(A) Weight ratio | (B)/(A) Number ratio |
|---|---|---|---|---|---|---|---|
| Reference example 1 | Open | 1.9 | 65 | — | — | 0/100 | 0/1 |
| Example 1 | Open | 1.9 | 65 | 1.5 | 65 | 20/80 | 0.42/1 |
| Example 2 | Open | 1.9 | 65 | 1.5 | 65 | 42/58 | 1.2/1 |
| Example 3 | Open | 1.9 | 65 | 1.5 | 65 | 63/37 | 2.9/1 |
| Comparative example 1 | Open | 1.9 | 65 | — | — | 0/100 | 0/1 |
| Comparative example 2 | Open | 1.9 | 65 | — | — | 0/100 | 0/1 |
| Comparative example 3 | Open | 1.9 | 65 | — | — | 0/100 | 0/1 |
| Reference example 2 | Encapsulated | 1.9 | 65 | — | — | 0/100 | 0/1 |
| Example 4 | Encapsulated | 1.9 | 65 | 1.5 | 65 | 20/80 | 0.42/1 |
| Example 5 | Encapsulated | 1.9 | 65 | 1.5 | 65 | 42/58 | 1.2/1 |
| Example 6 | Encapsulated | 1.9 | 65 | 1.5 | 65 | 63/37 | 2.9/1 |
| Comparative example 4 | Encapsulated | 1.9 | 65 | — | — | 0/100 | 0/1 |
| Comparative example 5 | Encapsulated | 1.9 | 65 | — | — | 0/100 | 0/1 |
| Comparative example 6 | Encapsulated | 1.9 | 65 | — | — | 0/100 | 0/1 |
| Reference example 3 | Sealed | 2.2 | 75 | — | — | 0/100 | 0/1 |
| Example 7 | Sealed | 2.2 | 75 | 1.5 | 75 | 18/82 | 0.40/1 |
| Example 8 | Sealed | 2.2 | 75 | 1.5 | 75 | 41/59 | 1.3/1 |
| Example 9 | Sealed | 2.2 | 75 | 1.5 | 75 | 62/38 | 3.0/1 |
| Comparative example 7 | Sealed | 2.2 | 75 | — | — | 0/100 | 0/1 |
| Comparative example 8 | Sealed | 2.2 | 75 | — | — | 0/100 | 0/1 |
| Comparative example 9 | Sealed | 2.2 | 75 | — | — | 0/100 | 0/1 |

| | Microspheres packing ratio (%) | Retroreflective performance (cd/lx · m$^2$) | Appearance |
|---|---|---|---|
| Reference example 1 | 70 | 620 | 5 |
| Example 1 | 70 | 486 | 5 |
| Example 2 | 70 | 375 | 5 |
| Example 3 | 70 | 260 | 5 |
| Comparative example 1 | 50 | 443 | 3 |
| Comparative example 2 | 32 | 368 | 2 |
| Comparative example 3 | 18 | 248 | 1 |
| Reference example 2 | 70 | 364 | 5 |
| Example 4 | 70 | 289 | 5 |
| Example 5 | 70 | 225 | 5 |
| Example 6 | 70 | 152 | 5 |
| Comparative example 4 | 50 | 260 | 3 |
| Comparative example 5 | 32 | 217 | 2 |
| Comparative example 6 | 18 | 150 | 1 |
| Reference example 3 | 70 | 146 | 5 |
| Example 7 | 70 | 124 | 5 |
| Example 8 | 70 | 97 | 5 |
| Example 9 | 70 | 70 | 5 |
| Comparative example 7 | 50 | 104 | 3 |
| Comparative example 8 | 32 | 84 | 2 |
| Comparative example 9 | 18 | 58 | 1 |

As stated in the foregoing, the lens-type retroreflective sheeting of the present invention is characterized by using transparent microspherical lenses (A) and transparent microspherical fillers (B) in mixing, and thereby, it becomes possible to control its retroreflective performance without changing the packing ratio, particle size, etc. of the transparent microspheres, and retroreflective sheeting having an excellent appearance, a certain thickness and desired retroreflective performance can be obtained easily.

What is claimed is:

1. A retroreflective sign for displaying information which comprises lens-type retroreflective sheeting forming at least one first region corresponding to image and comprising at least one first retroreflective layer, and lens-type retroreflective sheeting forming at least one second region corresponding to background for said image and comprising at least one second retroreflective layer;

wherein said at least one first retroreflective layer comprises a mixture of transparent microspherical lenses (A) having a refractive index of at least 1.8 and transparent microspherical fillers (B) having a refractive index which differs from the refractive index of lenses (A) by at least 5%; wherein the transparent lenses (A) and transparent filler (B) are contained in said at least one first retroreflective layer at a total packing ratio falling within the range of from about 60 to about 90%;

said at least one second retroreflective layer comprises transparent microspheres with substantially the same packing ratio as that of the transparent microspheres in said at least one first retroreflective layer; and wherein the mixing ratio of lenses (A) to fillers (B) in said at least one first retroreflective layer is different than the mixing ratio of transparent microspheres in said at least one second retroreflective layer, such that, when the retroreflective sheeting is illuminated, the brightness of the image is different from the brightness of the background.

2. The retroreflective sign of claim 1 wherein the transparent microspheres in each of the at least one first and at least one second retroreflective layers have an average particle size which is substantially the same.

3. A retroreflective sign for displaying information which comprises lens-type retroreflective sheeting forming at least one region corresponding to image and comprising at least one first retroreflective layer; and lens-type retroreflective sheeting forming at least one region corresponding to background for said image and comprising at least one second retroreflective layer;

wherein said at least one second retroreflective layer comprises a mixture of transparent microspherical lenses (A) having a refractive index of at least 1.8 and transparent microspherical fillers (B) having a refractive index which differs from the refractive index of lenses (A) by at least 5%; wherein the transparent lenses (A) and transparent filler (B) are contained in said at least one second retroreflective layer at a total packing ratio falling within the range of from about 60 to about 90%;

said at least one first retroreflective layer comprises transparent microspheres with substantially the same packing ratio as that of the transparent microspheres in said at least one second retroreflective layer; and wherein the number mixing ratio of lenses (A) to fillers (B) in said at least one second retroreflective layer is different than the mixing ratio of transparent microspheres in said at least one first retroreflective layer, such that the brightness of the image is different from the brightness of the background when the retroreflective sign is illuminated.

4. The retroreflective sign of claim 3 wherein the transparent microspheres in each of the at least one first and at least one second retroreflective layers have an average particle size which is substantially the same.

5. A retroreflective sign which comprises lens-type retroreflective sheeting forming at least one first region corresponding to image and comprising at least one first retroreflective layer, and lens-type retroreflective sheeting forming at least one second region corresponding to background for said image and comprising at least one second retroreflective layer;

wherein the at least one first retroreflective layer comprises a mixture of transparent microspherical lenses (A) having a refractive index of at least 1.8 and transparent microspherical fillers (B) having a refractive index which differs from the refractive index of lenses (A) by at least 5%;

the at least one second retroreflective layer comprises a mixture of said lenses (A) and said fillers (B);

wherein the lenses (A) and filler (B) are present in said at least one first retroreflective layer at a total packing ratio which is substantially the same as the total packing ratio in said at least one second retroreflective layer and, wherein then number mixing ratio of lenses (A) to filler (B) in said at least one first retroreflective is different than the number mixing ratio of lenses (A) to filler (B) in said at least one second retroreflective layer, whereby the brightness of the image is different from the brightness of the background when the retroreflective sign is illuminated.

6. The retroreflective sign according to claim 5 wherein the transparent microspheres (A) and (B) in each of said at least one first end at least one second retroreflective layers have average particle sizes which are substantially the same.

7. The retroreflective sign according to claim 5 which comprises encapsulated lens-type retroreflective sheeting forming said at least one first region and said at least one second region.

8. The retroreflective sign according to claim 7 wherein the refractive index of the transparent microspherical lenses (A) is within the range of from 1.8 to 2.0.

9. The retroreflective sign according to claim 8 wherein the difference in refractive indices of the lenses (A) and fillers (B) is at least 15%.

10. The retroreflective sign according to claim 9 wherein the total packing ratio of lenses (A) and fillers (B) in each of said at least one first and second retroreflective layers is within the range of 65 to 85%.

11. The retroreflective sign according to claim 10 wherein the number mixing ratio of fillers (B)/lenses (A) in said at least one first and second retroreflective layers varies within the range of from 1/5 to 9/2.

12. A retroreflective sign for displaying information corresponding to image on a background, wherein the image and background are each formed from encapsulated lens-type retroreflective sheeting having a support layer, a substantial monolayer of transparent microspheres partially embedded in one surface of the support layer, a light reflective layer coating on the portion of the transparent microspheres which are embedded in the one surface of the support layer, a transparent surface protective film facing in spaced relationship to the one surface of the support layer, and the protective film being bonded to the one surface of the support layer via a series of continuous bonding lines to thereby form a plurality of sealed, small compartment cells, each of the sealed cells containing therein a substantial monolayer of transparent microspheres, the non-embedded portions of which are exposed to the atmosphere within the sealed cell, wherein the sign comprises at least two different regions, at least one first region corresponding to said image to be viewed when the retroreflective sign is illuminated by a source of light and at least one second region corresponding to background for the image, and the transparent microspheres include a blend of transparent microspherical lenses (A) having a refractive index of at least 1.8 and transparent microspherical filler (B) having a refractive index which differs by at least 5% from the refractive index of the microspherical lenses (A), and wherein the number mixing ratio of filler (B) to lenses (A) is different in the at least one first region corresponding to image than in the at least one second region corresponding to background.

13. The retroreflective sheeting of claim 12 wherein the microspherical lenses (A) and the microspherical fillers (B) have substantially the same average particle size and wherein the lenses (A) and filler (B) in the substantial monolayer are contained in a total packing ratio which is from about 60% to about 90% and wherein the mixing number ratio of the fillers (B) to lenses (A) is within the range of from about 1/10 to about 5/1.

* * * * *